March 18, 1947.  C. LYNN  2,417,770
EXCITATION SYSTEM
Filed July 2, 1945

WITNESSES:
Wm. B. Sellers.
T. P. Lyle

INVENTOR
Clarence Lynn.
BY O. B. Buchanan
ATTORNEY

Patented Mar. 18, 1947

2,417,770

UNITED STATES PATENT OFFICE 2,417,770

EXCITATION SYSTEM

Clarence Lynn, Wilkinsburg, Pa., assignor to Westinghouse Electric Corporation, East Pittsburgh, Pa., a corporation of Pennsylvania Application July 2, 1945, Serial No. 602,866

5 Claims. (Cl. 171—223)

The present invention relates to excitation systems for alternating-current generators, and more particularly to an excitation system utilizing an exciter having a self-excited field winding, in which provision is made for stability of the exciter at low voltages.

Synchronous alternating-current generators require direct-current field excitation, which is usually supplied by means of a separate direct-current generator, or exciter. In many cases the field winding of the exciter is separately excited by means of a smaller direct-current generator, or pilot exciter. It is sometimes desired, however, to avoid the use of a pilot exciter because the pilot exciter, being a small machine, is thought to be less reliable than the main exciter. When no pilot exciter is used, the main exciter is provided with a self-excited shunt field winding. There is one difficulty in the use of a self-excited exciter, however, which has not heretofore been satisfactorily overcome. It is sometimes necessary to operate the main alternating-current generator at low voltage, as when starting up, and this requires low-voltage operation of the exciter. It is also sometimes desirable to operate in service with the main exciter operating at reduced voltage, either with a rheostat in the field circuit of the alternating-current generator, or at still lower voltages without a rheostat in the field circuit of the alternating-current generator to avoid the loss in the rheostat. A self-excited direct-current generator, however, tends to become unstable at low voltages, and no way is known of obtaining a high degree of low-voltage stability in such a machine without impairing its ability to generate the desired rated voltage. Sufficient stability at low voltages can be obtained in a direct-current generator by adding a separately excited field winding to provide a relatively small, substantially constant component of excitation, if a suitable source of separate excitation is available. In the case of an exciter for an alternating-current generator, which is usually installed in a central station, the station battery could be used as a source of separate excitation for the exciter, but this has been considered undesirable because of the constant drain on the battery.

The principal object of the present invention is to provide an excitation system for alternating-current generators which utilizes an exciter having a self-excited shunt field winding, and also having a separately excited field winding to provide the necessary stability at low voltages, the separately excited field winding being energized only when it is needed, so that a station battery may be used as a source of separate excitation without objectionable drain on the battery.

A further object of the invention is to provide an excitation system for alternating-current generators utilizing an exciter which has a self-excited shunt field winding and a separately excited field winding, in which the separately excited winding is energized only when needed, and in which the excitation of the separately excited winding is decreased as the excitation of the self-excited winding is increased, so that even when the separately excited winding is energized, the drain on the battery, or other source of separate excitation, is kept very small, and is never any larger than is necessary to provide stability.

Further objects and advantages of the invention will be apparent from the following detailed description taken in connection with the accompanying drawing, in which.

Figure 1:
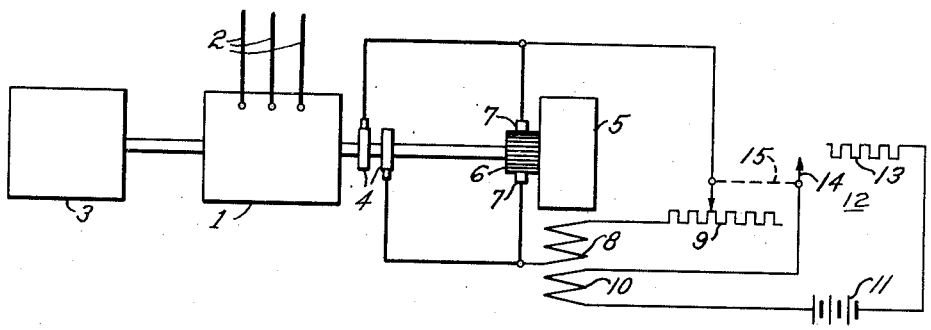
Figure 1 is a schematic diagram of a preferred embodiment of the invention.

The invention is illustrated in Fig. 1 embodied in an excitation system for an alternating-current generator 1, which is connected to supply a three-phase line 2, and which is driven by a prime mover 3 of any suitable type, such as a steam turbine. The generator 1 has slip rings 4 mounted on its shaft, which are connected to the rotating field member. Direct-current excitation is supplied to the field winding of the generator 1 by means of an exciter 5, which is a direct-current generator of any suitable construction, having a commutator 6 and brushes 7 which are connected to brushes riding on the slip rings 4 to connect the output of the exciter 5 to the field winding of the generator 1. The exciter 5 is shown as being connected directly to the shaft of the generator 1 so as to be driven by the same prime mover, although it might be driven in any other suitable manner.

The exciter 5 has a shunt field winding 8, which is connected across the brushes 7 in series with a field rheostat 9 so as to be self-excited. The exciter 5 also has a relatively smaller, separately excited field winding 10, which is energized from a suitable external source, such as a battery 11. A rheostat 12 is connected in series with the separately excited winding 10 and the battery 11.

The rheostat 12, which controls the separately excited winding 10, consists of a resistance element 13 and a movable contact arm 14. The rheostat 12 may be of any suitable construction but is arranged so that when the contact arm 14 is in one extreme position, as shown in the drawing, it is out of contact with the resistance element 13, and thus interrupts the circuit of the winding 10. The construction of the rheostat 12 is such that as the arm 14 is moved toward its other extreme position, it engages the resistance element 13 at a predetermined point in its movement to complete the circuit, and as it moves further, it reduces the resistance in the circuit, and thus increases the current in the field winding 10. The rheostats 9 and 12 are mechanically connected together in any suitable manner, as indicated by the dotted connection 15, the arrangement being such that the two rheostats are operated simultaneously but in opposite senses, that is, one rheostat increases its resistance as the other rheostat decreases its resistance.

In normal operation of the system, the rheostats 9 and 12 are in substantially the position shown in the drawing, in which the circuit of the field winding 10 is open so that it is deenergized, and there is no drain on the battery 11. The rheostat 9 is toward the low resistance end of its movement so that the current in the self-excited winding 8 is relatively high, and the exciter 5 is operating in its normal voltage range to supply the required excitation to the generator 1 for operation of the generator at its normal voltage.

For low voltage operation of the exciter 5, as required for operation of the generator 1 at low voltage, as when starting, the rheostats 9 and 12 are operated to move then toward the other extreme position, that is, toward the right as seen in the drawing, the two rheostats operating together because of their mechanical connection. As this movement occurs, the rheostat 9 increases its resistance and thus decreases the current in the field winding 8 to reduce the output voltage of the exciter 5. At a predetermined point in this movement, when the voltage of the exciter 5 has been considerably reduced, the contact arm 14 of the rheostat 12 engages the resistance element 13 and completes the circuit for the separately excited winding 10, thus adding another component of excitation to the resultant field of the exciter 5. It will be noted that at this point the resistance of the rheostat 12 is at its maximum so that the current in the field winding 10 is very small. Further movement of the two rheostats in the same direction to further reduce the exciter voltage results in a further decrease of the current in the self-excited winding 8, but increases the curent in the separately excited winding 10. It will be understood, of course, that the winding 10 is a relatively small winding, and that even maximum current in this winding is relatively low, so that the component of excitation provided by it is always quite small as compared to that of the self-excited winding 8. This small additional component of excitation, however, is sufficient to maintain stability of the exciter 5 at low voltages and since it increases relative to the self-excited component of the excitation as the voltage is reduced, its effect is increased as the need for it increases.

If the rheostats 9 and 12 are moved in the other direction to raise the voltage of the exciter 5 by increasing the current in the self-excited winding 8, the current in the separately excited winding 10 is correspondingly decreased, so that the magnitude of the separately excited component of excitation is never any larger than is necessary, and thus the drain on the battery 11 is kept low at all times when it is in use, and is never any higher than necessary to obtain the desired result. For higher voltage operation, where the self-excited winding alone provides stable operation, the circuit of the separately excited winding 10 is interrupted by the rheostat 12, and thus there is no drain on the battery 11 at all during normal operation.

Figure 2:
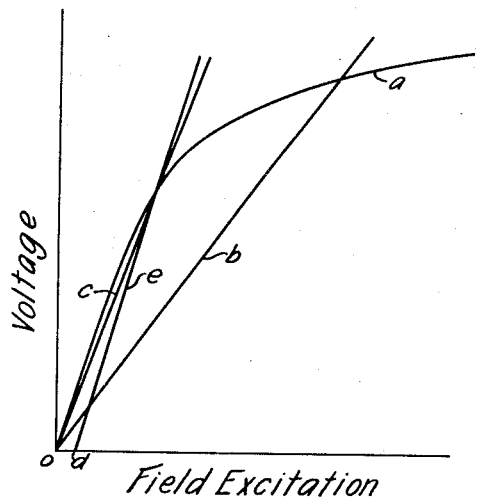
Fig. 2 shows certain curves explanatory of the invention.

The operation of the excitation system described above in maintaining stability of the exciter at low voltages is illustrated by the curves of Fig. 2. In this figure, the curve $a$ is a no-load saturation curve of a typical direct-current generator, such as may be used as an exciter. The curve $b$ represents the normal self-excited excitation of such a generator, and it will be seen that in the normal voltage range the generator is entirely stable. For low-voltage operation, however, the shunt field current is reduced, and the excitation line changes to a position such as that indicated at $c$. It will be apparent from the figure that when this position is reached, the machine is approaching instability, and any further reduction in voltage will result in an unstable condition. In accordance with the arrangement described above, this condition of instability is avoided by the introduction of a component of separate excitation, the maximum value of which is indicated at $od$, and which decreases as the self-excited component increases. The effect of this is to swing the resultant excitation line to the position indicated at $e$, which corresponds to the same voltage as the excitation line $c$, but which avoids any tendency to instability.

Thus, by means of the present invention, low-voltage stability is obtained without requiring a continuous drain on the source of separate excitation, since the separately excited field winding 10 is energized only when it is needed to maintain stability of the exciter. A simple and effective arrangement is provided in this way which makes it possible to eliminate the use of a pilot exciter for exciting the field winding of a main exciter, but without sacrifice of stability of the exciter during low-voltage operation. Since the separately excited field winding is energized only when it is needed, and then only to the extent necessary, any available source of separate excitation, such as a station battery, can be used without subjecting it to a continuous drain, and without subjecting it to a greater drain than necessary, even when it is required.

A specific embodiment of the invention has been shown and described for the purpose of illustration, but it will be apparent that the invention is capable of various other modifications and embodiments, and it is to be understood, therefore, that the invention is not limited to the particular arrangement shown, but in its broadest aspects, it includes all other modifications and embodiments which come within the scope of the appended claims.

I claim as my invention:

1. An excitation system for an alternating-current generator, said system comprising a direct-current generator for supplying exciting current to said alternating-current generator, said direct-current generator having a self-excited shunt field winding and a separately excited field winding, means for controlling the current in said self-excited field winding to control the voltage of the direct-current generator, and means for energizing said separately excited field winding only when said controlling means is adjusted for low-voltage operation of the direct-current generator.

2. An excitation system for an alternating-current generator, said system comprising a direct-current generator for supplying exciting current to said alternating-current generator, said direct-current generator having a self-excited shunt field winding and a separately excited field winding, means for controlling the current in said self-excited field winding to control the voltage of the direct-current generator, and means for energizing said separately excited field winding only when said controlling means is adjusted for low-voltage operation of the direct-current generator, said energizing means including means for controlling the current in the separately excited field winding to increase the current in the separately excited field winding as the current in the self-excited field winding decreases.

3. An excitation system for an alternating-current generator, said system comprising a direct-current generator for supplying exciting current to said alternating-current generator, said direct-current generator having a self-excited shunt field winding and a separately excited field winding, means for controlling the current in said self-excited field winding to control the voltage of the direct-current generator, and means for energizing said separately excited field winding only when said controlling means is adjusted for low-voltage operation of the direction-current generator, said energizing means including means for controlling the current in the separately excited field winding, said last-mentioned controlling means being adapted for operation simultaneously with the first-mentioned controlling means to increase the current in the separately excited field winding as the current in the self-excited field winding is decreased, the excitation of the separately excited field winding being small relative to that of the self-excited field winding.

4. An excitation system for an alternating-current generator, said system comprising a direct-current generator for supplying exciting current to said alternating-current generator, said direct-current generator having a self-excited shunt field winding and a separately excited field winding, rheostat means for controlling the current in said self-excited field winding, means for energizing said separately excited field winding from a substantially constant voltage source, said energizing means including rheostat means for controlling the current in the separately excited field winding, said last-mentioned rheostat means also being adapted to effect interruption of the circuit of the separately excited field winding, and means for effecting operation of the last-mentioned rheostat means so that the separately excited field winding is deenergized during normal operation of the direct-current generator and is energized only when the first-mentioned rheostat means is adjusted for low-voltage operation of the direct-current generator.

5. An excitation system for an alternating-current generator, said system comprising a direct-current generator for supplying exciting current to said alternating-current generator, said direct-current generator having a self-excited shunt field winding and a separately-excited field winding, rheostat means for controlling the current in said self-excited field winding, means for energizing said separately excited field winding from a substantially constant voltage source, said energizing means including rheostat means for controlling the current in the separately excited field winding, said last-mentioned rheostat means also being adapted to effect interruption of the circuit of the separately excited field winding, said two rheostat means being connected for simultaneous operation in such a manner as to change their respective resistances in opposite senses, the second-mentioned rheostat means being adjusted so that the separately excited field winding is deenergized during normal operation of the direct-current generator and is energized only when the first-mentioned rheostat means is adjusted for low-voltage operation of the direct-current generator, the current in the separately excited field winding then increasing as the current in the self-excited field winding decreases.

CLARENCE LYNN.